Patented Apr. 15, 1947

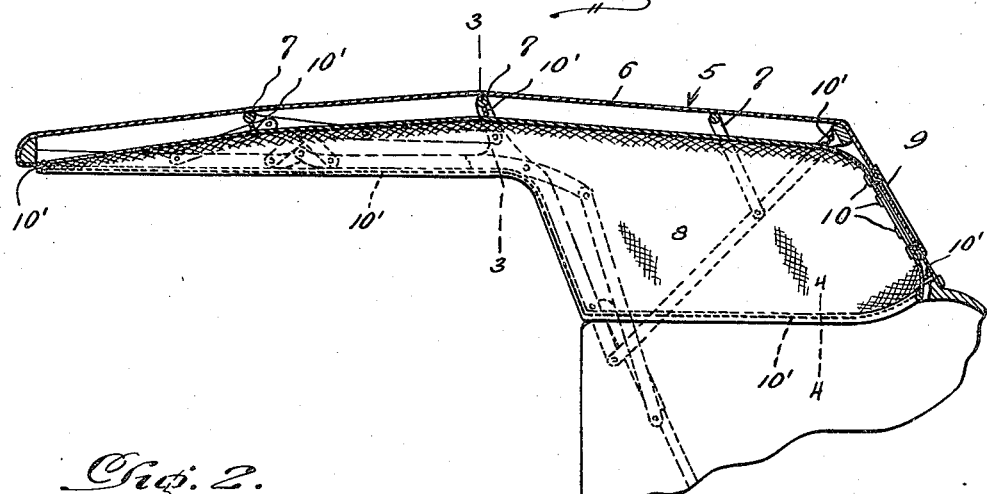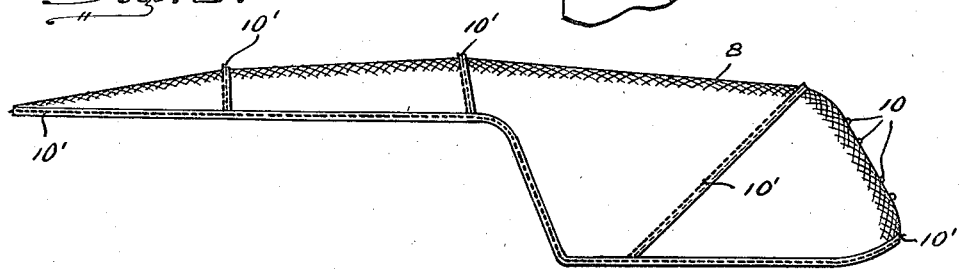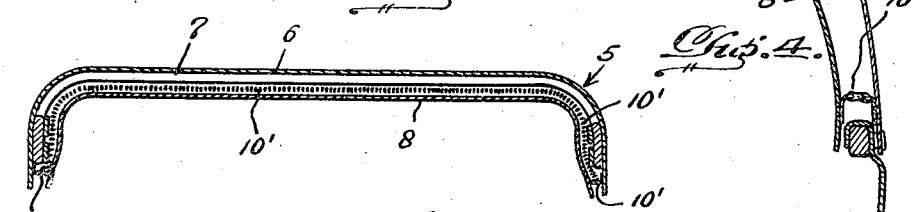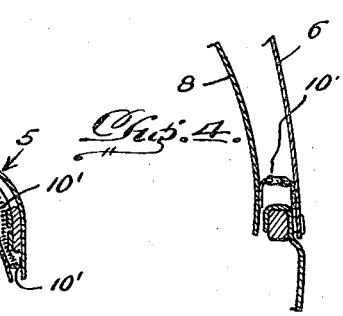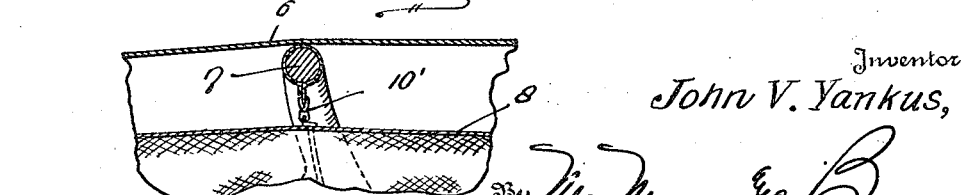

2,418,918

UNITED STATES PATENT OFFICE 2,418,918

AUTOMOBILE TOP LINING

John V. Yankus, Hyde Park, Mass.

Application October 30, 1943, Serial No. 508,285

3 Claims. (Cl. 296—137)

This invention relates to an inner covering or lining for foldable automobile tops, and has for the primary object the provision of a removable device of this character which will normally conceal from view the interior of the motor vehicle top covering as well as the supporting bows therefor, to provide a better appearance to the interior of the motor vehicle and also protect the inner face of the top covering from damage and may be easily removed for cleaning when soiled or for renewal when damaged.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a longitudinal vertical section taken longitudinally and centrally of the top illustrating a foldable automobile top equipped with a lining or inner covering constructed in accordance with my invention.

Figure 2 is a side elevation illustrating the lining or inner covering.

Figure 3 is a transverse sectional view taken on the line 3—3 of Figure 1.

Figure 4 is a fragmentary transverse sectional view taken on the line 4—4 of Figure 1.

Figure 5 is an enlarged fragmentary vertical sectional view showing the connection between the lining and one of the supporting bows of the top.

Referring in detail to the drawings, the numeral 5 indicates in entirety a foldable top of a motor vehicle, 6 the covering material of the top and 7 the bows for supporting the covering material. It is a well known fact that after an automobile top of this character has been in use, the inner surface of the top material becomes soiled, mildewed or otherwise damaged rendering an unsightly appearance to the automobile top as well as spoiling the general appearance of the automobile on the inside thereof.

To eliminate the foregoing disadvantages and to provide a neat appearance to the interior of the automobile top, a lining or inner covering 8 is provided corresponding in shape with the general shape of the automobile top or the covering material 6 thereof. The lining or inner covering 8 is closely positioned with respect to the top covering 6 and is arranged under the supporting bows 7 so as to completely conceal the latter from view as well as the under face of the covering material 6 of the top 5. Usually the top 5 is provided with a window 9 in the rear thereof, and the lining or inner covering 8 will be provided with an opening to match the window and be secured to the window frame by separable fasteners 10 such as the conventional type of snap fastener so that the lining or inner covering can be easily detached therefrom when desired.

To maintain the inner covering or lining in place upon the interior of the automobile top, a series of slide fasteners are employed and are commercially known as "zippers" and are indicated generally by the character 10. It is preferable that the slide fasteners be secured to the top material 6 and the lining 8 slightly above the free edges so that when the lining is in place it will conceal the slide fasteners from view. Some of the slide fasteners connect the lining to some of the bows, as shown in Figures 3 and 5.

It is preferable that the slide fasteners work from the forward edge of the top along the longitudinal edges toward the rear of the top when removing the lining or inner covering from the top. As the lining or inner covering is freed from the forward end portion of the top it will expose the slide fasteners employed for connecting the lining to some of the bows so that they can be easily actuated to free the lining from the bows.

The lining 8 may be constructed of any material suitable for the purpose and preferably of a material that can be easily cleaned in an ordinary manner so that the lining when soiled may be washed or otherwise treated to remove the foreign matter therefrom and thereby recondition the lining so it can be restored to use and present a neat appearance to the interior of the top. Also the lining may be of a waterproof material to prevent the inner surface of the top material 6 from becoming wet or damp as to bring about mildewing or similar damage thereto.

It is to be noted that while the top material or fabric and the lining fabric are closely arranged, they nevertheless define an air space between said fabrics except the portion about the window.

The slide fastener elements are located between portions of fabric covering and portions of the fabric lining whereby said slide fastener elements are shielded from the weather and unnecessary contact.

While I have shown and described the preferred embodiment of my invention, it will be understood that minor changes in construction, combination and arrangement of parts may be made without departing from the spirit and scope of the invention as claimed.

Having thus described my invention, what I claim is:

1. A removable lining for foldable automobile tops, said lining consisting of one unit of flexible material and having a top portion and a depending edge portion and having a slide fastener element extending entirely around its depending edge portion in combination with a slide fastener element secured on the juxtaposed edge of the automobile top and the edge of the car body, the rear portion of said lining having a window opening portion in superposed relation to the automobile top window, said window opening portion being provided with snap fastener elements adapted to cooperate with complemental snap fastener elements located on and about the window of the automobile top, said lining having transversely extending slide fastener elements located intermediate the front and rear edge portions of the lining in further combination with slide fastener elements located on the transversely arranged supports of the automobile top, the depending edge portion of the lining being narrow throughout a major portion of the lining, the remainder or minor edge portion being broad and extending from the top down to the car body.

2. The combination of a foldable automobile top having a fabric covering and an attachable and readily detachable washable fabric lining fitted and supported within said foldable top, the juxtaposed edges of said top and lining being provided with cooperating slide fastener elements along their juxtaposed edges throughout a major portion thereof, the remaining portion of said fastener elements being secured to the car body and to the juxtaposed edge of said lining, said automobile top having a window in its rear portion and said lining having a window opening with the edges of said window opening disposed about said window and detachably secured thereabout by snap fasteners.

3. The combination set forth in claim 2, in which all of the slide fastener elements are located between portions of the fabric covering and portions of the fabric lining whereby said slide fastener elements are shielded from the weather and unnecessary contact.

JOHN V. YANKUS.

REFERENCES CITED

The following references are of record in the file of this patent:

UNITED STATES PATENTS

| Number | Name | Date |
| --- | --- | --- |
| 1,294,489 | LaPlante | Feb. 18, 1919 |
| 1,307,073 | Alvey | June 17, 1919 |
| 1,908,233 | Fisher | May 9, 1933 |
| 1,468,203 | Horne et al. | Sept. 18, 1923 |
| 1,321,389 | Paradis et al. | Nov. 11, 1919 |